United States Patent
Higano et al.

(10) Patent No.: US 8,562,016 B2
(45) Date of Patent: Oct. 22, 2013

(54) CURTAIN AIRBAG DEVICE AND METHOD OF MANUFACTURING THE SAME

(75) Inventors: Makoto Higano, Kanagawa (JP); Takayoshi Saegusa, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 455 days.

(21) Appl. No.: 12/600,155

(22) PCT Filed: May 14, 2008

(86) PCT No.: PCT/JP2008/001209
§ 371 (c)(1),
(2), (4) Date: May 24, 2011

(87) PCT Pub. No.: WO2008/139737
PCT Pub. Date: Nov. 20, 2008

(65) Prior Publication Data
US 2011/0215556 A1 Sep. 8, 2011

(30) Foreign Application Priority Data
May 14, 2007 (JP) .................................. 2007-127526

(51) Int. Cl.
*B60R 21/16* (2006.01)
(52) U.S. Cl.
USPC ..................................... 280/730.2; 280/743.1
(58) Field of Classification Search
USPC .................................. 280/730.2, 743.1, 743.2
See application file for complete search history.

(56) References Cited

U.S. PATENT DOCUMENTS

| 6,991,256 | B2* | 1/2006 | Henderson et al. | 280/730.2 |
| 7,083,188 | B2* | 8/2006 | Henderson et al. | 280/730.2 |
| 7,125,037 | B2* | 10/2006 | Tallerico et al. | 280/728.2 |
| 7,357,408 | B2* | 4/2008 | Hall et al. | 280/728.2 |
| 7,547,038 | B2* | 6/2009 | Coleman | 280/728.2 |
| 7,815,216 | B2* | 10/2010 | Minamikawa | 280/728.2 |
| 7,823,914 | B2* | 11/2010 | Cheal et al. | 280/730.2 |
| 2005/0104335 | A1* | 5/2005 | Henderson et al. | 280/728.2 |
| 2006/0192368 | A1* | 8/2006 | Hall et al. | 280/730.2 |
| 2007/0024031 | A1* | 2/2007 | Coleman | 280/728.2 |
| 2007/0241539 | A1* | 10/2007 | Jang et al. | 280/728.2 |
| 2009/0302581 | A1* | 12/2009 | Yokota et al. | 280/728.2 |

FOREIGN PATENT DOCUMENTS

| JP | 2001-219807 A | 8/2001 |
| JP | 2002-187518 A | 7/2002 |

* cited by examiner

*Primary Examiner* — Toan To
(74) *Attorney, Agent, or Firm* — Brinks Hofer Gilson & Lione

(57) ABSTRACT

In at least one embodiment of the present invention, an airbag capable of maintaining a stable attachment to a vehicle for a long period and a method of manufacturing the airbag are provided. The curtain airbag device comprises an airbag body accommodated to a window upper edge of a vehicle for expanding and inflating toward inside of the vehicle in a compressed state when it is deployed. A plurality of strip-shaped coupling members are coupled with the airbag body. A plurality of brackets are coupled with the airbag body for fixing the airbag body to the vehicle. Each bracket has a coupling hole through which each strip-shaped coupling member is inserted and a fixing hole into which a tightening member is inserted. The airbag body is coupled with the brackets by the strip-shaped coupling members as well as the airbag body is fixed to the vehicle through the brackets by the tightening members.

14 Claims, 3 Drawing Sheets

CURTAIN AIRBAG DEVICE AND METHOD OF MANUFACTURING THE SAME

CROSS REFERENCE TO RELATED APPLICATIONS

This application claims priority to PCT Patent Application PCT/JP2008/001209 filed May 14, 2008, and Japan Patent Application JP2007-127526 filed May 14, 2007.

FIELD OF THE INVENTION

The present invention relates to a curtain airbag device for protecting passengers by inflating an airbag when a vehicle emergency event occurs, such as for example in a roll-over, lateral collision, overturn, and the alike event. More particularly, the invention relates to a structure of portions of a curtain airbag attached to a vehicle.

BACKGROUND OF THE INVENTION

In general, an inner panel (body panel) covered by a headliner (e.g. interior roof covering) is disposed above side windows of a passenger compartment. An airbag body of a curtain airbag is accommodated in a folded state in a space formed by the headliner and the inner panel such as for example, as referenced below in Patent Documents 1 and 2. When the curtain airbag device is operated or deployed, the airbag body is expanded by a gas supplied from an inflator and is inflated into a compartment by pushing down and moving the lower edge of the headliner.

Patent Document 1: Japanese Patent Application Laid-Open No. 2001-219807
Patent Document 2: Japanese Patent Application Laid-Open No. 2002-187518

Conventionally, when a curtain airbag is attached to a vehicle, a cushion (e.g. airbag body) is clamped by metal parts (e.g. brackets), and the brackets are coupled with and fixed to the cushion by partly deforming the brackets. The curtain airbag is positioned in the brackets and bolts are inserted through the brackets and fixed to the vehicle. However, in the structure described above, since the cushion is positioned between the brackets, there is a possibility that an initial torque at the time when the brackets are initially fixed by the bolts becomes lower as time passes. Furthermore, when the brackets are coupled with the cushion, since the brackets are attached to the cushion by being deformed, dedicated equipment is required in a manufacturing process of the airbag.

SUMMARY OF THE INVENTION

In one embodiment of the present invention, an airbag device is provided that can maintain a stable torque over a long period of time for attachment to the vehicle. A method of manufacturing the airbag device is also provided.

In a second embodiment, an airbag device is provided which can easily couple an airbag body (e.g. cushion) with brackets without requiring special equipment when they are coupled with each other. A method of manufacturing such an airbag device is also provided.

In one aspect of the present invention, the curtain airbag device has a airbag body accommodated to a window upper edge of a vehicle for expanding and inflating toward the inside of the vehicle in a compressed state when it is operated. A plurality of strip-shaped coupling members are coupled with the airbag body, and a plurality of brackets are coupled with the airbag body for fixing the airbag body to the vehicle. Each of the plurality of brackets has a coupling hole through which each of the strip-shaped coupling members is inserted and a fixing hole into which a predetermined tightening member is inserted. The airbag body is coupled with the brackets by the strip-shaped coupling members, and the airbag body is fixed to the vehicle by the tightening members being inserted through the brackets and fixed to the vehicle.

A method of manufacturing a curtain airbag device according to one aspect of the invention has a step of coupling the airbag body with the brackets by inserting the one end of the strip-shaped coupling members through the coupling holes of the brackets and then coupling both the ends with the airbag body. The airbag body is then folded and compressed.

According to the curtain airbag device of the present invention with the above structure, since the brackets are directly tightened and fixed to the vehicle without interposing the airbag body (e.g. cushion) therebetween, a tightening torque can be maintained without being substantially reduced as time passes.

Since the airbag body is coupled with the brackets by inserting the strip-shaped coupling members through the coupling holes and sewing, for example, both the ends of strip-shaped coupling members to the airbag body, a task of coupling can be more easily performed without using special equipment.

[Further, in the invention, since the brackets can come into contact with the strip-shaped coupling members over the entire surfaces of the strip-shaped coupling members, advantageously the coupling strength of the brackets with the airbag body and further the coupling strength of the vehicle with the airbag body can be improved. More specifically, when the airbag body is inflated at the time the airbag device is operated and a force for pulling the brackets downward acts on the brackets, the force can be supported by the entire width of the strip-shaped coupling members. In contrast, in a conventional art, even if a strip-shaped coupling member is clamped between two brackets, a large force acts within a very small range as in a case when the force is substantially supported in portions where bolts are in contact with coupling members (e.g. tabs). Accordingly, there is a case that the portion, where the bracket is coupled with the tab, must be reinforced to obtain the strength of the portion.

It is preferable to design the brackets (and coupling holes) and the strip-shaped coupling members so that the strip-shaped coupling members optionally move with respect to the brackets. When the strip-shaped coupling members freely (e.g. smoothly) move with respect to the brackets, the brackets can be kept in a free attitude without being restricted by the long and relatively heavy airbag body. As a result, attachment to the vehicle can be easily performed using a tightening tool such as bolts and the alike.

BRIEF DESCRIPTION OF THE DRAWINGS

FIG. 2A and FIG. 2B are explanatory views showing a structure of a main portion of the curtain airbag device according to a first example of the invention, wherein FIG. 2A shows a state that a bracket is coupled with an airbag body, and FIG. 2B shows a state of a tab before the bracket is attached; and FIG. 3A and FIG. 3B are explanatory views showing a structure of a main portion of a curtain airbag device according to another example of the invention, wherein FIG. 3A shows a state where a bracket is coupled with an airbag body, and FIG. 3B shows a state before the bracket is attached.

DETAILED DESCRIPTION OF THE INVENTION

At least one embodiment of the present invention is provided below with reference to the drawings.

Figure 1:
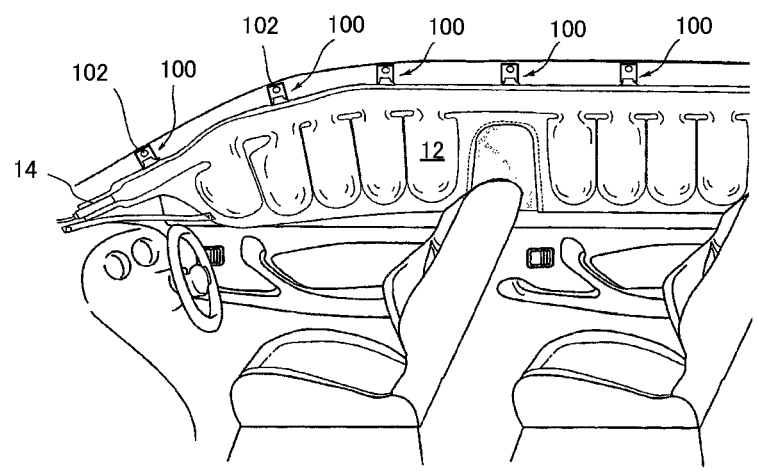
FIG. 1 is a sectional view of a passenger compartment having a curtain airbag device according to an example of the present invention.

FIG. 1 is a sectional view of a passenger compartment having a curtain airbag device according to an example of the present invention. As shown in FIG. 1, for example, in a passenger car type vehicle, an inner panel covered by a headliner is disposed above side windows of the passenger compartment. The curtain airbag device is fixed to the inner panel by bolts using brackets 100. In FIG. 1, reference numeral 102 denotes fixing holes (e.g. bolt holes) for the bolts formed to the brackets 100.

The curtain airbag device has an airbag body 12 and a gas supply unit (e.g. inflator) 14. The airbag body 12 is accommodated in a state that it is covered by the headliner disposed adjacent to a window upper edge of the vehicle and protects passengers in the vehicle by being expanded and inflated downward from a gap between the headliner and the inner panel when it is deployed, and the inflator 14 supplies an expansion gas to the airbag body 12.

The airbag body 12 is formed in a bag-shaped body by sewing, bonding, or welding two overlapping sheets or has a bag portion formed by weaving a single sheet. The airbag body 12 has a plurality of chambers which expand when the airbag body 12 is operated and a duct portion which extends in a longitudinal direction on the upper side of the chambers and distributes the gas to the respective chambers. A method of folding the airbag body 12 is not particularly limited and various methods such as a so-called "accordion folding" method, a "rolling" method, and the like can be employed.

When an emergency event such as a roll-over, lateral collision, overturn, and the alike occurs while a vehicle is moving, a sensor disposed to the vehicle detects abnormal vibrations and sends an ignition signal to the inflator (e.g. gas generation unit) 14 based on the signal. The inflator 14 has a propellant which is disposed therein that drives the inflator 14 in response to the ignition signal from the sensor. The expansion gas is filled in the airbag body 12 by operating the inflator 14, and the airbag body 12 is inflated so that the headliner is pressed down and expanded or moved (e.g. forcibly torn and blown off). The side windows are covered by the inflated airbag body 12 so that the passengers in the vehicle are protected.

Figure 2A:
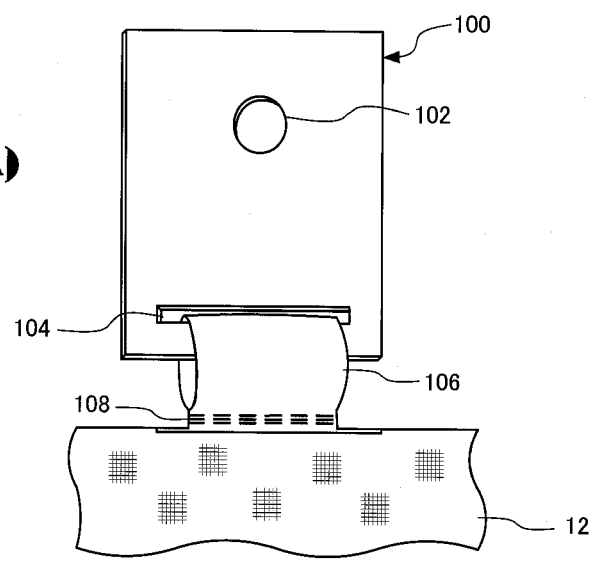
Figure 2B:
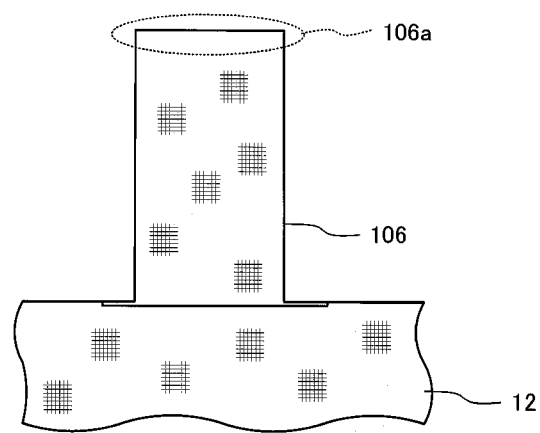

FIG. 2A and FIG. 2B are explanatory views showing a structure of a main portion of a curtain airbag device according to a first example of the invention. FIG. 2A shows a state where a bracket 100 is coupled with an airbag body 12, and the FIG. 2B shows a state of a tab 106 prior to the bracket 100 being attached thereto. The curtain airbag device according to the example has the airbag body 12, a plurality of the tabs 106, and a plurality of the brackets 100. The airbag body 12 is accommodated to a window upper edge of a vehicle in a compressed state and expanded and inflated toward the inside of the vehicle when it is operated. The plurality of tabs 106 are coupled with the airbag body 12, and the plurality of brackets 100 fix the airbag body 12 to the vehicle.

The plurality of brackets 100 have slit-shaped coupling holes or slots 104, through which the tabs 106 are inserted, circular fixing holes 102 through which bolts are inserted. The airbag body 12 is coupled with the brackets 100 by the tabs 106. The airbag body 12 is fixed to the vehicle by the bolts (not shown) through the brackets 100.

As shown in FIG. 2B, the strip-shaped tab 106 is formed of the same material as that of the airbag body 12 and may be integral therewith. An end portion 106a of the tab 106 is annularly formed passing through the coupling hole 104 of the bracket 100 and is sewed to a portion which is coupled with the airbag body 12 or to the other end of the tab 106 itself.

The bracket 100 is molded of a metal sheet having a strength sufficient to support the airbag body 12 that is expanded and inflated. The fixing hole 102 has an inside diameter which is necessary for the bolt to pass therethrough. The coupling hole 104, through which the tab 106 passes, is formed in a laterally long slit-shape and has a width and a height to allow the tab 106 to easily move therein.

When the curtain airbag device arranged as described above is manufactured (e.g. assembled), after the end portions 106a of the tabs 106 are inserted through the coupling holes 104 of the brackets 100, the end portions 106a are sewed to the airbag body 12 or to the end portions (roots) of the tabs 106. As a result, the airbag body 12 is coupled with the brackets 100. In this state, the airbag body 12 having the brackets 100 is folded and compressed.

When the curtain airbag device according to this example is assembled to the vehicle, the airbag device, which is folded to a thick rope-shape, is carried to the vicinity of the window upper edge, the bolts (not shown) are inserted into the fixing holes 102 of the brackets 100, and the airbag device is fixed to the vehicle by tightening the bolts.

In this example, since the brackets 100 are directly tightened and fixed to the vehicle without interposing the airbag body (e.g. cushion) 12 therebetween, a tightening torque can be maintained or suppressed from being reduced as time passes.

Since the airbag body 12 is coupled with the brackets 100 by inserting the tabs 106 through the coupling holes 104 that are formed in brackets 100 and sewing the end portions of the tabs 106, a coupling task or job can be easily performed without using special equipment.

Further, since the coupling holes 104 of the bracket 100 and the tabs 106 are designed so that the tabs 106 freely move relative to the brackets 100, the brackets 100 can be kept in a free attitude without being restricted by the long and relatively heavy airbag body 12. As a result, the job of attaching the airbag device to the vehicle can be easily performed using a tightening tool of a bolt or the alike.

Figure 3A:
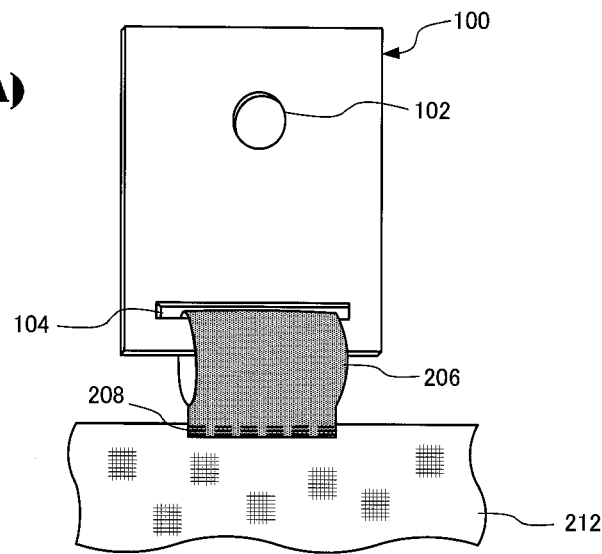
Figure 3B:
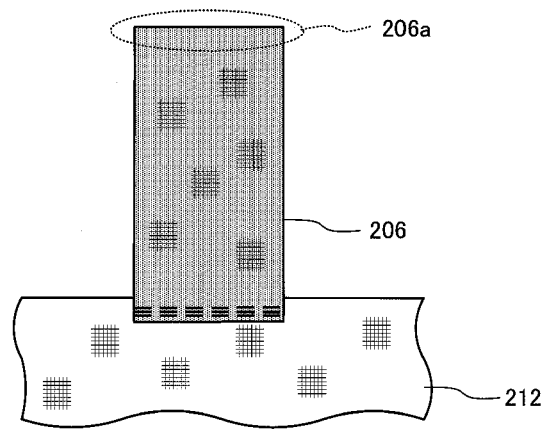

FIG. 3A and FIG. 3B are explanatory views showing a structure of a main portion of a curtain airbag device according to a second example of the present invention, wherein FIG. 3A shows a state where a bracket 100 is coupled with an airbag body 212, and FIG. 3B shows a state before the bracket 100 is attached to the bracket 100. The curtain airbag device according to the second example is different from the airbag device according to the first example described above in that strip-shaped coupling members 206 are composed of separate or different members from the airbag body 212. The other main arrangements of the second example are similar to those of the first example and are therefore omitted with reference to FIG. 3A and FIG. 3B.

As shown in FIG. 3B, each strip-shaped coupling member 206 is composed of the member different from the airbag body 212 and has an end portion 206a inserted through a coupling hole 104 of each bracket 100. With this arrangement, the strip-shaped coupling member 206 is formed in annular shape and sewed to a portion with which the airbag body 212 is coupled or to the other end of the strip-shaped coupling member 206 itself. The structure of the bracket 100 is similar to that of the bracket 100 in the first example described above.

When the curtain airbag device is manufactured (e.g. assembled), one end of each of the strip-shaped coupling members 206 is sown to the upper edge portion of the air bag body 212. Next, after the end portions 206a of the strip-shaped coupling members 206 are inserted through the coupling holes 104 of the brackets 100, the end portions 206a are sewed to the airbag body 212 or to the end portions (e.g. roots) of the strip-shaped coupling members 206. With this operation, the airbag body 212 is coupled with the brackets 100. In this state, the airbag body 12 having the brackets 100 is folded (and/or rolled) and compressed. Note that it is also possible to sew and fix both the ends of the strip-shaped coupling members 206 to the bag body 212 at the same time after the strip-shaped coupling members 206 are inserted through the coupling holes 104 of the brackets 100.

A method of assembling the curtain airbag device to a vehicle in accordance with the second example is also similar to that of the first example as described above.

Since the strip-shaped coupling member 206 is composed of different or separate members in the second example, there is an advantage in that a degree of freedom is increased for coupling the brackets 100 to the airbag body 212. More specifically, for example, it is possible to perform a sewing job at the same time to a plurality of units, each of which has the strip-shaped coupling member 206 passed through the coupling hole 104 of the bracket 100 and which are disposed along the edge portion of the airbag body 212.

Although the examples of the present invention have been explained above, the present invention is not limited to these examples and can be variously modified in design and the like within the scope which does not depart from the embodiments disclosed in the claims. Moreover, the curtain airbag device according to the present invention can be applied not only to a passenger car type vehicle but also to various types of vehicles such as for example a truck and the alike. Further, although the material of the brackets 10 is metal in these examples, other material (e.g. plastic, resin, and the alike) having a sufficient mechanical strength may be used.

The invention claimed is:

1. A curtain airbag device for a vehicle comprising:
    an airbag body disposed adjacent to a window upper edge of the vehicle in a compressed state for expanding and inflating toward an inside of the vehicle when deployed;
    a plurality of strip-shaped coupling members coupled with the airbag body; and
    a plurality of brackets coupled with the airbag body for fixing the airbag body to the vehicle,
    wherein each of the brackets has a coupling hole through which one of the strip-shaped coupling members is inserted and a fixing hole into which one of a plurality of tightening members is to be inserted,
    the airbag body is coupled with the brackets by the strip-shaped coupling members, and
    the airbag body is fixed to the vehicle by the tightening members through the brackets.

2. The curtain airbag device according to claim 1, wherein the strip-shaped coupling members have ends that are fixed to the airbag body.

3. The curtain airbag device according to claim 2, wherein the ends of the strip-shaped coupling members are coupled with the airbag body by sewing.

4. The curtain airbag device according to claim 1, wherein the strip-shaped coupling members are tabs integrally formed with and of the same material as the airbag body.

5. The curtain airbag device according to claim 1, wherein the strip-shaped coupling members are arranged as members different from the airbag body.

6. A method of manufacturing a curtain airbag device for a vehicle, the method comprising:
    coupling an airbag body with brackets by inserting one of two ends of strip-shaped coupling members through coupling holes formed in the brackets and then coupling both the ends with the airbag body; and
    folding and compressing the airbag body which has the brackets.

7. The method of manufacturing the curtain airbag device according to claim 6, wherein the ends of the strip-shaped coupling members are coupled with the airbag body by sewing.

8. The method of manufacturing the curtain airbag device according to claim 6, wherein the strip-shaped coupling members are tabs formed with and of the same material as the airbag body.

9. The method of manufacturing the curtain airbag device according to claim 6, wherein the strip-shaped coupling members are arranged as members different from the airbag body.

10. A curtain airbag device, for a vehicle comprising:
    an airbag body configured to be disposed adjacent to a window upper edge of the vehicle in a compressed state for expanding and inflating toward an inside of the vehicle when deployed;
    a plurality of strip-shaped coupling members coupled with the airbag body; and
    a plurality of brackets coupled with the airbag body for fixing the airbag body to the vehicle,
    wherein each of the plurality of brackets includes:
        a coupling hole through which one of the strip-shaped coupling members is inserted; and
        a fixing hole through which a tightening member for fixing the airbag body to the vehicle is inserted through the brackets, and
        the airbag body is coupled with the brackets by the strip-shaped coupling members.

11. The curtain airbag device according to claim 10, wherein the strip-shaped coupling members have ends that are fixed to the airbag body.

12. The curtain airbag device according to claim 11, wherein the ends of the strip-shaped coupling members are coupled with the airbag body by sewing.

13. The curtain airbag device according to claim 10, wherein the strip-shaped coupling members are tabs integrally formed with and of the same material as the airbag body.

14. The curtain airbag device according to claim 10, wherein the strip-shaped coupling members are arranged as members different from the airbag body.

* * * * *

UNITED STATES PATENT AND TRADEMARK OFFICE
CERTIFICATE OF CORRECTION

PATENT NO. : 8,562,016 B2  Page 1 of 1
APPLICATION NO. : 12/600155
DATED : October 22, 2013
INVENTOR(S) : Higano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Fifteenth Day of September, 2015

Michelle K. Lee
*Director of the United States Patent and Trademark Office*